United States Patent Office 3,822,249
Patented July 2, 1974

3,822,249
METHOD FOR MANUFACTURE OF KETOSE SUGARS
Leon Tumerman, Deerfield, and Jules H. Guth, Mount Prospect, Ill., assignors to Kraftco Corporation, New York, N.Y.
No Drawing. Filed Apr. 19, 1971, Ser. No. 135,437
Int. Cl. C13k 9/00
U.S. Cl. 260—209 R                          10 Claims

ABSTRACT OF THE DISCLOSURE

The invention is directed to a method for manufacture of ketose sugars from aldose sugars by heating a solution of the aldose sugar in the presence of an alkali or alkaline earth aluminate catalyst so as to convert the aldose sugar to a ketose sugar in high yields. Thereafter, the ketose sugar is recovered from the reaction mixture by treatment with a suitable agent.

---

The present invention relates to the manufacture of ketose sugars from aldose sugars and more particularly relates to isomerization of aldose sugars in the presence of an alkali or alkaline earth aluminate catalyst.

It is known to use alkali and alkaline earth aluminates, hereinafter sometimes referred to as aluminates or aluminate catalysts, to effect the isomerization of aldose sugars to ketose sugars. For example, it is disclosed in U.S. Pat. No. 2,487,121 to Fetzer et al., issued Nov. 8, 1949, that the monosaccharide aldose sugar, glucose, can be isomerized to ketose sugar, fructose, by means of aluminate catalysts. It is also disclosed in U.S. Pat. No. 3,546,206 to Guth et al., issued Dec. 8, 1970, that the disaccharide aldose sugar, lactose, can be isomerized to the ketose sugar, lactulose, in high yields, by means of aluminate catalysts. However, the reaction mixture which is formed when alkali or alkaline earth aluminate catalysts are used to effect isomerization of aldose sugars is not readily handled and it is difficult to recover the ketose sugar from the reaction mixture.

Accordingly, it is an object of the present invention to provide an improved method for the production of ketose sugars from aldose sugars. It is another object of the present invention to provide a method for recovering sugars from a reaction mixture containing alkali or alkaline earth aluminate materials. It is a further object of the present invention to provide an improved method for converting aldose sugars to ketose sugars and for recovering the ketose sugars from the reaction mixture.

These and other objects of the present invention will become more apparent from the following detailed disclosure.

Generally, the invention is directed to a method for manufacture of ketose sugars from aldose sugars by heating a solution of the aldose sugar in the presence of an alkali or alkaline earth aluminate catalyst so as to convert the aldose sugar to a ketose sugar in high yields. Thereafter, the ketose sugar is recovered from the reaction mixture by treatment with a suitable agent.

A surprising discovery of the present invention is that alkali or alkaline earth aluminates may be used as a general catalyst to effect isomerization of aldose sugars to ketose sugars in high yields. Preferably, the method of the invention is used to effect isomerization of mono or disaccharide aldose sugars to the ketose form. The method is particularly suitable for the conversion of lactose to lactulose and glucose to fructose. However, the method may be used to effect conversion of other aldose sugars to ketose sugars, such as maltose to maltulose, galactose to tagatose, xylose to xylulose and ribose to ribulose.

While not wishing to be bound by any theory, it is believed that the isomerization by aluminate salts is attained by formation of intermediate sugar-alumminate complexes. The complexes isolate the ketose sugar and permit attainment of high levels of conversion of aldose sugars to ketose sugars. Levels of conversion of aldose sugars to the ketose sugars of up to about 80 percent are attained.

In effecting the isomerization reaction, a solution of an aldose sugar is first prepared. Any suitable solvent may be used which solubilizes the sugar and the aluminate catalyst and permits the isomerization reaction to occur. The preferred solvent is water. The sugar may be present at a level of from about 5 percent by weight to about 60 percent by weight of the solution.

The alkali or alkaline earth aluminate catalyst is then added to the sugar solution to provide a reaction mixture. In this connection, calcium or sodium aluminate is the preferred catalyst. Calcium and sodium aluminate are preferred for reasons of economy and availability. However, potassium aluminate, barium aluminate and strontium aluminate may also be used. The aluminate catalyst is added to the sugar solution at a level of from about 0.50 moles to about 4 moles per mole of sugar present in the solution. It is preferred that the aluminate catalyst be present at a level of from about 1 to about 3 moles per mole of sugar.

After addition of the aluminate catalyst the reaction mixture will be basic and the pH will be from about 9 to over 13. Lower levels of aluminate catalyst may be used with a corresponding decrease in conversion level and efficiency. Also, higher levels of aluminate catalyst may be used but no added advantage is attained thereby, and recovery of the sugar from the reaction mixture becomes more difficult.

The reaction mixture is then preferably heated to effect more rapid isomerization of the aldose sugar to the ketose form. Heating is continued until the temperature of the sugar is from about 25° C. to about 130° C. The sugar solution is maintained within the indicated temperature range for a period of time sufficient to effect isomerization to the desired level. In this connection, a period of time of from about 1 minute to about 500 minutes is sufficient. It is also possible to use high temperature short time conditions wherein the sugar solution is heated to temperatures above 130° C. for short or no hold time.

The use of an aluminate catalyst can provide a higher level of conversion of the aldose sugar to ketose sugar with less sugar decomposition than is experienced with known alkaline isomerization catalysts. Any conversion level may be obtained up to about 80 percent of ketose sugar. If it is desired to stop the reaction prior to achieving maximum conversion, the reaction mixture may be acidified or cooled, or both. However, it is usually desired to attain as high a level of conversion as possible. Known alkaline isomerization catalysts, such as calcium hydroxide and other hydroxides, have not been capable of achieving conversion levels of aldose sugars to ketose sugars of above about 25 percent. The present invention provides a method for conversion of aldose sugars to ketose sugars at any level up to about 80 percent, and the method further provides for recovery of the ketose sugar from the reaction mixture.

After the aldose sugar has been converted to ketose sugar the reaction mixture is cooled. The reaction mixture is then acidified to release the sugar from the aluminate complex. It has been found that if the reaction was allowed to proceed after a maximum conversion, some sugar degradation may be incurred.

It has been found that if the reaction mixture is allowed to remain alkaline that the ketose sugar is less recoverable, and yields are lower. As previously indicated, it is believed that during the reaction the ketose sugar becomes bound to the aluminate ion in a complex form. The ketose sugar-aluminate complex is dissociated by acidifying the reaction mixture. As the pH of the reaction mixture is lowered, the ketose sugar-aluminate complex begins to dissociate and higher levels of ketose sugar are recovered. At a pH of about 12 only about 8 percent of the ketose sugar is recovered. At a pH of about 10 over 60 percent of the ketose sugar is recoverable. At a pH within the range of about pH 6 to about pH 8, the ketose sugar-aluminate complex becomes completely dissociated and the aluminate forms an aluminum hydroxide gel. The aluminum hydroxide gel, however, is extremely difficult to remove by filtration or other means and the method of the present invention overcomes such filtration problems.

As the pH of the reaction mixture is further lowered below about pH 6, the aluminum hydroxide gel solubilizes. Thereafter, the reaction mixture is treated in accordance with the invention to partition the sugars in the reaction mixture from the salts and to recover the sugars. The treatment of the reaction mixture may be effected by either of two general methods, which for the sake of convenience will be referred to herein as the "wet" method and the "dry" method.

In accordance with the dry method the reaction mixture is first subjected to drying by any suitable method which provides the dried product in particulate form. Spray drying is the preferred method for drying. Drying produces a matrix containing amorphous sugar, an aluminum salt and other inorganic salts. The cations of the salts are obtained from the alkali or alkaline earth cation of the aluminate catalyst, while the anions of the salts are obtained from the acid used to effect lowering of the pH.

It is preferred that the pH of the reaction mixture be lowered to about pH 5, prior to drying. However, the pH may be at any level below about pH 8 prior to drying. Excess acid may be used but it is preferred that the pH be not less than about 4 prior to drying. If the pH is between about 6 and about 8, the aluminum hydroxide gel present is dried to provide a dispersion within the matrix.

After the reaction mixture has been dried to provide a matrix, substantially all of the ketose sugar and a portion of the unconverted aldose sugar is partitioned from the matrix by treatment with a suitable organic material. The organic material is selected on the basis of being able to partition and remove the ketose sugar from the matrix while being relatively unable to dissolve and remove the salts. It has been determined that water miscible, polar organic materials are suitable for use in the present invention. In this connection, suitable alcohols, ketones, aldehydes and amides may be used. Water may be used in combination with a polar organic material up to a level of about 40 percent to increase the polarity thereof. Suitable polar organic materials include methyl alcohol, ethyl alcohol, propyl alcohol, methyl ethyl ketone, acetone, acetaldehyde, N,N-dimethyl foramid and combinations thereof. A particularly preferred organic material for reasons of economy, availability and efficiency is methyl alcohol. The efficiency of the polar organic material may be increased by combining the polar organic material with water. The presence of water tends to increase the polarity and efficiency of the polar organic material. In general, water may be present at a level of from about 0 percent to about 100 percent by volume, based on the volume of the polar organic material. It is preferred to use from about 10 percent to about 50 percent by volume of water, based on the volume of the polar organic material.

The partitioning treatment of the present invention is not comparable to conventional solvent extraction methods in that the sugars which are partitioned from the matrix are highly insoluble in the organic material used to effect partitioning. While not wishing to be bound by any theory it is believed that the sugars are attracted to and held by the organic material through a form of hydrogen bonding while the salts are not affected. In this connection the sugars must be present in the dried matrix in a substantially amorphous form to effect partitioning. The amorphous form of the sugar may be readily obtained by any suitable rapid drying method, such as by spray drying. If the sugars are present in a substantially crystalline form the organic material is not capable of effecting hydrogen bonding and the sugars cannot be partitioned from the matrix. Partitioning may also be achieved when the sugars are present in a solvated condition as will be described more fully hereinafter in a discussion of the wet method.

Any suitable method of contacting the matrix with the organic material may be used in the present invention. The polar organic material may be contacted continuously with the matrix in a column, or simple batch mixing of the polar organic material with the matrix and subsequent filtration or decantation may be used. The polar organic material is preferably used at a level of from about .01 liters per gram to about 1.0 liters per gram, with respect to the sugars present in the matrix, on a dry basis. At lower levels, the efficiency of recovery is reduced. Higher levels may be used but no increase in recovery is apparent and costs are higher.

After partitioning of the sugar from the matrix, the polar organic material containing the sugar is mixed with water and the polar organic material is removed by boiling. If water has been added to the polar organic material prior to partitioning of the sugar from the matrix, there may be no need for further additional water. Water should be present prior to boiling the polar organic material at a level of at least about 10 percent by weight of the material to prevent scorching or burning of the sugars.

When methanol is used as the polar organic material in the wet method, the methanol is added at a level of at least about one part of methanol to one part of water present in the reaction mixture, by volume. Higher levels of use of methanol provide higher levels of purity of the recovered sugars with respect to salt contamination. Levels of use of methanol of up to about 9 parts of methanol to one part of water by volume provide optimum increased purity. Higher levels of methanol may be used but no substantial benefits are obtained and the costs of recovery are increased.

After separation of the sugars from the salts by filtration or other suitable means, the sugars may be recovered from the fluid mixture of sugar, water and organic material by boiling off the organic material as previously described.

The following example illustrates various features of the invention, but is not intended to in anyway limit the scope of the invention, which is defined in the appended claims.

EXAMPLE I 45 lbs. of commercial sodium aluminate (Nalco 680) was dissolved in water (110 lbs.) and was heated, while being agitated, to 60° C. Crystalline lactose hydrate (100 lbs.) was then added to form a reaction mixture. The reaction mixture was maintained at 60° C. for 45 minutes, after which time 75 percent of the lactose had been converted to lactulose. The reaction mixture was then cooled to 10° C. In a separate glass-lined, jacketed vat, 96 percent sulfuric acid (36 lbs.) was added to cold water (20 gallons). The diluted acid was maintained at a temperature of 10° C. The reaction mixture was then added to the acid in the second vat. The reaction mixture was added rapidly, with constant agitation, while cold water (10° C.) was passed through the jacket of the vat. The temperature rose during the addition of the reaction mixture to 35° C. The pH of the reaction mixture prior to addition to the acid was 12.5; the pH of the reaction mixture after addition to the acid was 4.6. The neutralized reaction mixture was then spray dried to provide a dense amorphous matrix with a moisture level of 6.5 percent.

104 lbs. of the amorphous matrix obtained by spray drying the reaction mixture was then placed in a 50 gallon drum. 30 gallons of a mixture of methanol (80 percent) and water (20 percent) were then added to the drum. The mixture was stirred for 30 minutes and the undissolved portion of the matrix was allowed to settle to the bottom of the drum. About ⅔ of the clear supernatant liquor was then decanted from the drum. To the remaining sludge was added a further 30 gallons of a methanol and water mixture and the above steps were repeated for a second a third time. All of the supernatant liquor (about 60 gals.) was collected and placed into a 100 gallon distillation pot. The supernatant liquor was then distilled under vacuum of about 29″ until all of the methanol had been removed. The end point was determined when a sharp rise in temperature to 32° C. from 12° C. was noted. The final product, a sugar syrup, had no odor of methanol. The sugar syrup obtained was a light yellow color. The color was removed by adding 9 lbs. of activated charcoal (Derco 115·N) to the sugar solution and heating at 68° C. for 30 minutes while agitating the mixture. The activated charcoal was removed by vacuum filtration and the clear filtrate was then vacuum condensed until a 72 percent solids syrup was obtained. The final yield was 43.7 pounds of syrup or 31.4 pounds of sugar. The sugar was 85 percent lactulose, a ketose sugar, and 10 percent lactose, an aldose sugar.

EXAMPLE II

A lactose solution was reacted with sodium aluminate to provide a reaction mixture in accordance with the procedure of Example I. The reaction mixture had a pH of 13.0. The pH of the reaction mixture was adjusted to 7.0 with sulphuric acid so as to precipitate aluminum hydroxide and the reaction mixture was mixed with an equal quantity of water so as to disperse the gelatinuous aluminum hydroxide precipitant. The reaction mixture was then spray dried and washed with a methanol-water mixture and the product was purified as described in Example I. The final sugar product was 84 percent lactulose and 10 percent lactose.

EXAMPLE III 100 lbs. of crystalline lactose hydrate was added to 110 lbs. of water to provide a lactose solution. 45 lbs. of sodium aluminate was added to the lactose solution to provide a reaction mixture and the reaction mixture was heated to a temperature of 60° C. while being agitated. The reaction mixture was maintained at 60° C. for 50 minutes, after which time 75 percent of the lactose had been converted to lactulose and the pH of the reaction mixture was 13.0. The pH of the reaction mixture was then reduced to 4.5 by adding the reaction mixture to sulphuric acid as described in Example I.

To the aqueous reaction mixture was then added sufficient methanol to provide a mixture having 20 percent by weight of water and 80 percent methanol on a liquid basis. A salt sludge was formed as the methanol was added. The salt sludge was removed from the reaction mixture by filtration. The filtrate, containing the sugars, was treated by distillation and condensation to remove methanol as described in Example I and provide an aqueous sugar syrup having 70 percent solids. The final yield was 44 lbs. of syrup having 30.8 lbs. of sugar. The sugar was 88 percent lactulose and 12 percent lactose.

What is claimed is:

1. In a method for manufacture of ketose sugar from aldose sugar which includes the steps of providing a solution of a sugar selected from the group consisting of a monosaccharide and disaccharide aldose sugars, adding an alkali or alkaline earth aluminate catalyst to the sugar solution to provide a reaction mixture, and maintaining the reaction mixture at a temperature sufficient to substantially convert the aldose sugar to ketose sugar, the improvement comprising adjusting the pH of said reaction mixture to less than about 8 contacting said reaction mixture with methanol so as to partition impurities from said reaction mixture, and separating said methanol and said reaction mixture from said impurities, said methanol being added to said reaction mixture at a level sufficient to provide from about 1 to about 9 parts of methanol per part of water in said reaction mixture, said impurities being substantially derived from said catalyst.

2. A method in accordance with Claim 1 wherein said reaction mixture is dried to provide a matrix prior to contacting said reaction mixture with methanol.

3. A method in accordance with Claim 2 wherein said reaction mixture is acidified to a pH of less than about 8 prior to drying.

4. A method in accordance with Claim 2 wherein said methanol is combined with water prior to contacting with said dried reaction mixture.

5. A method in accordance with Claim 4 wherein said methanol is combined with water at levels within the range of from about 1 parts methanol per 1 part of water to about 9 parts methanol per 1 part of water by volume.

6. A method in accordance with Claim 1 wherein said reaction mixture is separated from said impurities by decantation.

7. A method in accordance with Claim 1 wherein said reaction mixture is separated from said impurities by filtration.

8. A method in accordance with Claim 1 wherein said methanol is removed from said reaction mixture by distillation.

9. A method in accordance with Claim 6 wherein said methanol is recovered from said reaction mixture by distillation.

10. A method in accordance with Claim 7 wherein said methanol is recovered from said reaction mixture by distillation.

References Cited
UNITED STATES PATENTS

| | | | |
|---|---|---|---|
| 3,256,270 | 6/1966 | Haack et al. | 260—209 R |
| 3,431,253 | 3/1969 | Parrish | 260—209 R |
| 3,546,206 | 12/1970 | Guth et al. | 260—209 R |

JOHNNIE R. BROWN, Primary Examiner